US012799891B2

(12) United States Patent
Geisick

(10) Patent No.: US 12,799,891 B2
(45) Date of Patent: Nov. 17, 2026

(54) ELECTRIFIED AIR SYSTEM FOR ENGINES

(71) Applicant: Deere & Company, Moline, IL (US)

(72) Inventor: Bryan T. Geisick, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/038,760

(22) Filed: Jan. 28, 2025

(65) Prior Publication Data

US 2025/0361829 A1 Nov. 27, 2025

Related U.S. Application Data

(60) Provisional application No. 63/651,535, filed on May 24, 2024.

(51) Int. Cl.
*F02B 37/04* (2006.01)
*F02B 37/10* (2006.01)
(Continued)

(52) U.S. Cl.
CPC .............. *F02B 37/04* (2013.01); *F02B 37/10* (2013.01); *F02B 39/10* (2013.01);
(Continued)

(58) Field of Classification Search
CPC ........ F02M 26/02; F02M 26/05; F02M 26/06; F02M 26/16; F02M 26/21; F02B 37/04; F02B 37/10; F02B 39/10
See application file for complete search history.

(56) References Cited

U.S. PATENT DOCUMENTS 7,047,743 B1 5/2006 Stahlhut et al.
7,155,334 B1 * 12/2006 Stewart ............... F02D 41/1452 123/434
(Continued)

FOREIGN PATENT DOCUMENTS

CN 114810336 A * 7/2022 .............. F02B 41/10
CN 110094260 B * 6/2023 ............. F04D 25/06
(Continued)

OTHER PUBLICATIONS

Machine generated translation of CN 110094260 B by Clarivate Analytics. (Year: 2023).*
(Continued)

*Primary Examiner* — Ngoc T Nguyen
(74) *Attorney, Agent, or Firm* — Tucker Ellis LLP; Bennett E. Kuhar

(57) ABSTRACT

An engine system has an electrified air system to selectively increase or decrease a flow of intake air and exhaust gas to the engine. The engine system includes an intake manifold and an exhaust manifold. The electrified air system may comprise an exhaust gas recirculation (EGR) system and an electric turbocharger. The electric turbocharger has a turbine in communication with the exhaust manifold and a compressor in fluid communication with the intake manifold. The turbine and compressor are coupled by a shaft that is engaged with an electric machine configured to control the rotation of the shaft. A controller may adjust the rotational speed of the electric turbocharger via the shaft to control the airflow entering the intake manifold. The electrical machine can generate energy from the rotation of the shaft and store it.

19 Claims, 7 Drawing Sheets

(51) Int. Cl.

| | |
|---|---|
| ***F02B 39/10*** | (2006.01) |
| ***F02D 41/00*** | (2006.01) |
| ***F02M 26/02*** | (2016.01) |
| ***F02M 31/20*** | (2006.01) |

(52) U.S. Cl.

CPC ..... *F02D 41/0007* (2013.01); *F02D 41/0047* (2013.01); *F02M 26/02* (2016.02); *F02M 31/20* (2013.01)

(56) References Cited

U.S. PATENT DOCUMENTS

| | | | | |
|---|---|---|---|---|
| 7,383,684 | B2 | 6/2008 | Vuk | |
| 11,572,824 | B2 | 2/2023 | Miles et al. | |
| 11,939,929 | B2 | 3/2024 | Dou et al. | |
| 2002/0124565 | A1 * | 9/2002 | Tsuji | F02D 21/08 60/605.2 |
| 2004/0231650 | A1 * | 11/2004 | Gray, Jr. | F02D 41/0007 123/568.12 |
| 2022/0170426 | A1 * | 6/2022 | Prochazka | F02B 37/18 |
| 2023/0265786 | A1 * | 8/2023 | Redon | F02M 26/02 123/51 A |
| 2025/0129738 | A1 * | 4/2025 | Stiller | F02M 26/03 |

FOREIGN PATENT DOCUMENTS

| | | | | | |
|---|---|---|---|---|---|
| CN | 116517734 | A | * | 8/2023 | F02M 26/49 |
| DE | 102011122442 | A1 | | 6/2013 | |
| DE | 102019114932 | A1 | | 12/2020 | |
| EP | 2041414 | B1 | | 6/2010 | |
| EP | 4310311 | A1 | * | 1/2024 | F02B 37/183 |
| WO | WO-2023016792 | A1 | * | 2/2023 | F02B 39/10 |

OTHER PUBLICATIONS

Machine generated translation of CN 116517734 A by Clarivate Analytics. (Year: 2023).*

German Search Report issued in application No. 102025113805.2 dated Nov. 28, 2025, 10 pages.

* cited by examiner

ELECTRIFIED AIR SYSTEM FOR ENGINES

CROSS-REFERENCE TO RELATED APPLICATION(S)

This application claims priority to U.S. Ser. No. 63/651,535, entitled ELECTRIFIED AIR SYSTEM FOR ENGINES, filed May 24, 2024, which is incorporated herein by reference.

BACKGROUND

Generally, internal combustion engines produce CO2 emissions. This is true for both spark-ignition engines, or SI engines, that are commonly used in cars and for compression-ignition engines, or CI engines, like diesel engines, which are commonly used for heavy-duty off-road applications. In order to meet greenhouse gas reduction goals, many manufacturers seek to reduce the engine's CO2 emissions. Some fuels produce lower CO2 emissions than others. For instance, renewable methane, hydrogen alcohols (like ethanol and methanol), and even ammonia are fuels that are considered low CO2 fuels. These fuels are commonly called high octane fuels and generally do not burn reliably unless they are perturbed. As such, these fuels are more appropriate for SI engines, where the fuel is ignited by a spark created in the combustion chamber. These fuels are difficult to use in CI engines where fuels are ignited only from heat produced from compressing the fuel in the compression chamber of the engine.

While SI engines are better for these low CO2 fuels, they are not without their drawbacks. SI engines typically run with higher exhaust temperatures than CI engines. This could be a problem when the engine is working around combustible material like hay or dry crops. Additionally, the higher exhaust temperatures can also lead to more rapid wear on manifolds, turbochargers, or catalysts. SI engines are generally less efficient than CI engines. First, the compression of the air/fuel mixture in SI engines is less thermodynamically efficient than the air, and possibly, EGR in CI engines. This is known as the gamma effect because gamma is the thermodynamic property that governs the compression process of engines. Further, all SI engines include some form of air flow regulation, like an air throttle or variable valvetrain, to maintain a perfect mixture of air and fuel entering the combustion chamber. Because of this throttling, SI engines generally have a slower transient response than CI engines. Compared to CI engines, SI engines may not be able to generate sufficient power at lower engine speeds. Because the low CO2 fuels more readily ignite and start to burn, when the premixed fuel is exposed to high temperatures in the cylinder long enough it will burn on its own. This phenomenon called engine knock can damage the engine. In some situations, the fuel and air mixture can begin to combust before an ignition source is activated leading to an event called pre-ignition, which can lead to knock or "super knock"; both result in catastrophic failure of the engine. These processes are more likely to occur at low engine speeds and high loads because of the time the fuel spends at high temperatures before the combustion process is initiated by the ignition system. Additionally, the tendency of engine knock occurring with SI engines and low CO2 fuels at low speeds also limits engine's compression ratio. Generally, the higher the engine's compression ratio, the more thermodynamically efficient the engine is.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for an engine system having an electrified air system. The engine system may have one or more piston-cylinder arrangements in fluid communication with an intake manifold and an exhaust manifold. The engine system may have an electrical power system configured to provide electrical power in the engine system, the electrical power system comprising an energy storage device and an electrical bus. The electrified air system may be powered by the electrical power from the electrical power system to selectively increase a flow of intake air and exhaust gas to the engine. The electrified air system may comprise an exhaust gas recirculation (EGR) system and an electric turbocharger. The electric turbocharger may have a turbine in communication with the exhaust manifold, a compressor in fluid communication with the intake manifold and driven by the turbine via a shaft coupled there between, and an electrical machine coupled to the shaft. The engine system may also have charge air cooler in fluid communication with an outlet of the compressor and the intake manifold. The electric air system may include a controller having a processor and memory architecture, operably connected with the electrified air system. The controller may be configured to operate the electrical machine to control a rotational speed of the shaft. The controller may selectively control the electrical machine to increase the rotational speed of the shaft to increase the speed of the compressor or decrease the rotational speed of the shaft to decrease the speed of the compressor to control an air to fuel mixture entering the intake manifold.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
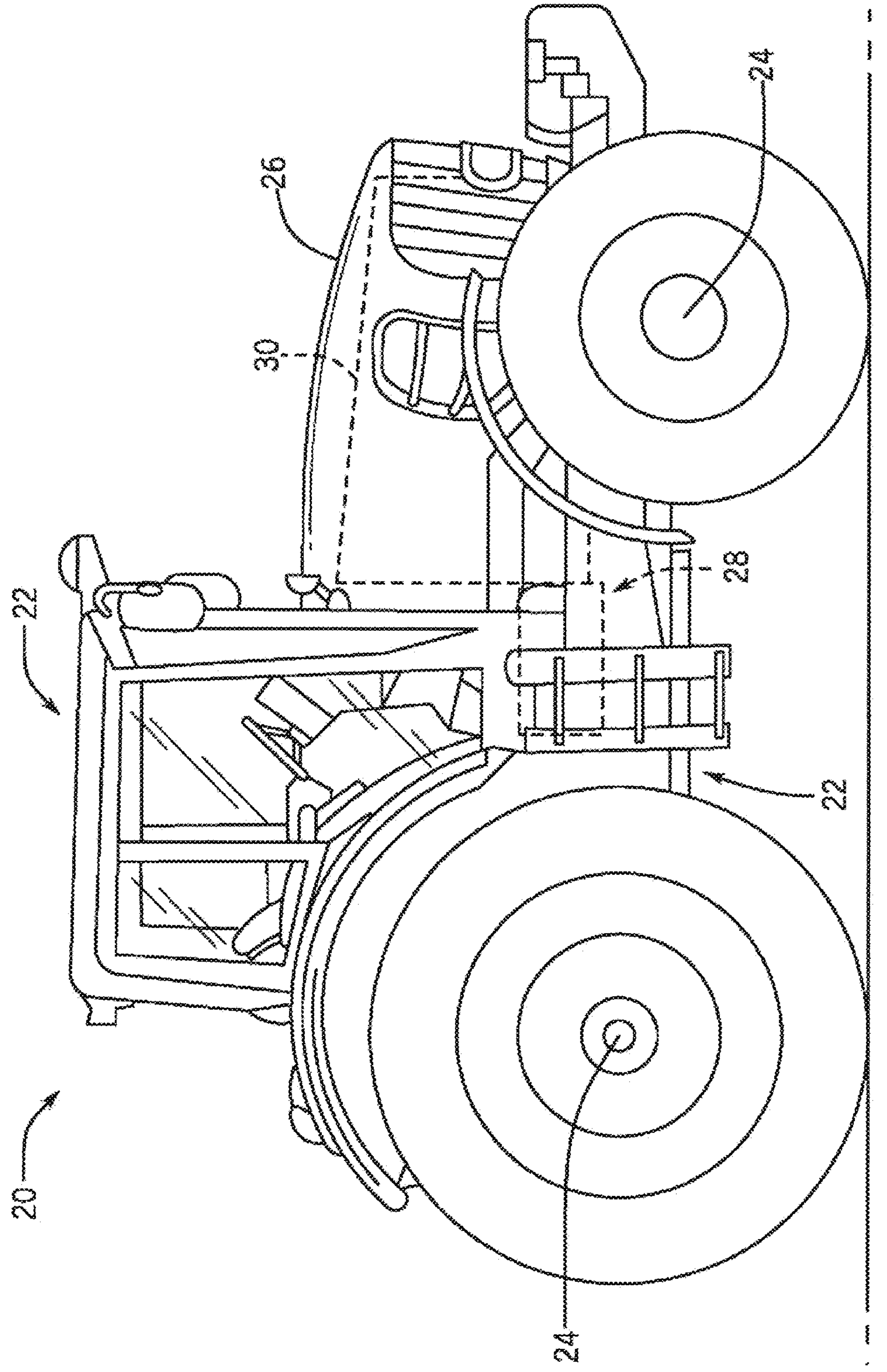
FIG. 1 is a component diagram illustrating an example implementation of a vehicle in which various examples of the electrified air system can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, relating to one or more electrified air systems for engines may be suitable for use in different applications, such as for engines in different applications, such as agricultural applications, highway applications, power generation applications, pumping applications, etc. That is, the examples disclosed herein can be implemented arrangements and configurations depending on the application of the engine.

Turbochargers are used extensively with CI engines. Generally, turbochargers harness exhaust energy that would otherwise be wasted and increase the power output of the engine. Turbochargers include a turbine that is in fluid communication with the engines exhaust manifold, a compressor that is in fluid communication with the engine's intake manifold, and a shaft that connects the turbine and the compressor. The compressor pressurizes the air that goes into the intake manifold of the engine. In operation of the turbocharger, exhaust gas produced by the engine is used to drive a turbine of the turbocharger, with exhaust gas flowing through the turbine and causing it to rotate, thereby driving a compressor of the turbocharger such that the compressor forces air into the combustion chambers of the engine. The more air that you force into the engine, the more power the engine can produce. Internal combustion engines may include turbocharger(s) and an EGR system to boost a supply of intake air and regulate exhaust gas to combustion chambers within the engine.

An exhaust gas recirculation system, or an EGR system, may also be used with internal combustion engines. EGR systems are generally used to reduce nitrogen oxide emissions. The EGR system operates to recirculate a portion of exhaust gas output from the engine back to the intake manifold thereof. This process helps lower the combustion temperature, reducing the formation of nitrogen oxides, which are harmful pollutants. In SI engines, EGR is also a method to control the speed of combustion. It can be used to avoid combustion knock and to lower exhaust temperatures. In high pressure EGR systems that include an EGR valve, examples of which are described below, to control a flow of exhaust gas back to the intake manifold, the EGR valve allows such EGR flow when the exhaust side pressure in the engine system is higher than the intake side pressure (i.e., a negative engine dP). The engine dP is dependent on engine configuration and combustion system requirements. For instance, the engine dP could in the range of −150 kPa to −15 kPa. In EGR systems that include an EGR pump to control a flow of exhaust gas back to the intake manifold, the EGR pump enables such EGR flow across a broader dP range, including for small negative dP values and positive dP values. EGR systems can include an EGR cooler to cool the recirculated exhaust gases before they are reintroduced into the engine cylinders. The EGR cooler may be a heat exchanger that uses engine coolant to lower the temperature of the exhaust gases. If the recirculated exhaust gas is not cooled before being mixed with air or introduced into the cylinder, EGR becomes less effective at reducing the likelihood of combustion knock occurring.

To address the inefficiencies common to SI engines, an SI engine system with an electrified air system can be provided that includes an electric turbocharger (e-turbocharger) and an EGR cooler. The electrified air system receives power from an electrical power system that includes an energy storage device and an electrical bus. In operation of the electrified air system, an electrical machine, for instance an electric motor, of the e-turbocharger may operate in a motoring mode to drive a shaft coupling the turbine to the compressor to cause the compressor to output boosted intake air to the engine. Inclusion of the e-turbocharger and EGR cooler in the electrified air system allows for the efficiency of the SI engine to be increased in a number of ways. Primarily, in using the electric machine of the e-turbocharger, a control system can control (speed up or slow down) the compressor of the e-turbocharger to provide precise air flow that the SI engine needs. That is, operation of the electrical machine ensures that the turbocharger is able to provide boosted intake air to the engine across a broad range of engine operating conditions (speeds and loads) with no negative impact to transient response. The transient response time may be improved for SI engines.

As an example, the e-turbocharger can provide the precise air flow required to maintain a precise ratio of air and fuel for an SI engine. As previously described, this was traditionally done with the use of an air throttle, which throttled how much air was being introduced into the engine. The amount of air was matched with the precise amount of fuel and ultimately controlled the power output of the engine. Throttling is generally considered energy loss because the engine is building pressure, and that pressure is being throttled back down to maintain airflow. Instead of throttling, the electrified air system can use the electric machine of the e-turbocharger to either decrease the speed of the turbocharger to produce a lower boost pressure, increase the speed of the turbocharger to produce a higher boost pressure, or maintain the speed of the turbocharger to maintain the boost pressure. As such, in one implementation, the e-turbocharger can reduce the throttling that is required to maintain the air/fuel ratio. An air throttle may make fine adjustments to the boost pressure provided to the intake of the engine if needed. For instance, if the e-turbocharger is not fast enough to adjust to an abrupt power change, the air throttle may momentarily close to account for this. Therefore, the e-turbocharger would primarily be used to manage the airflow, and the air throttle would be used to make fine adjustments to the airflow or to help with abrupt changes. In another implementation, the use of the e-turbocharger may allow for the air throttle to be removed from the SI engine.

In traditional engine systems with a turbocharger, if the throttle is closed abruptly, there is a large spike in pressure in the air system. This large spike in pressure created by the compressor is known as surge. Traditional turbochargers cannot change speed quickly because of the rotational inertia present in the turbocharger. As a result, the compressor continues to spin at high RPMs (as high as 350 kRPM) after the throttle has been closed and the pressure continues to build in the engine system. Surge events that occur under moderate to high boost pressures severely damage turbocharger bearings in a few events. To prevent damage to the engine and turbocharger, a check valve or relief valve is included in the intake system to release the excess pressure to avoid surge and reduce the system pressure if surge does occur. The use of an e-turbocharger allows for the check valve or relief valve to be removed. When the throttle is closed abruptly, the controller can command the electric machine of the e-turbocharger to slow down abruptly to prevent the pressure from spiking in the intake system.

Low pressure EGR loops are typically problematic in SI engines because of the lag time required to deliver EGR to the combustion system to avoid combustion knock during transient operation. However, if an appropriate compression ratio is selected there is more margin to avoid knock in an SI engine and therefore can tolerate some additional lag in EGR flow delivery. Efficiency losses from lower compression ratio would be overcome by the efficiency gain in utilizing an e-turbocharger.

In addition to the electrical machine operating in a motoring mode to drive the turbocharger shaft to boost intake air to the engine, the electrical machine is also operable in a generating mode to transform rotational power from the shaft into electrical power that is provided back into the electrical power system. The electrical machine can operate in generating mode to convert thermal energy and kinetic energy from the exhaust system back into electric power at engine states where the flow of intake air to the engine is adequate and/or when shaft power exceeds intake air flow requirements. The electrical power produced by the electrical machine while operating in generating mode can be provided back into the electrical power system to recharge the energy storage device therein or added to the engine crankshaft using an e-machine to directly increase the power output of the engine. This is typically known as e-turbo-compounding. The electrified air system can therefore improve the power density of the electrical system of the vehicle.

A controller may perform control functions regarding the electrified air system to further improve efficiency in operation of the engine system. For example, the controller can command the electric machine of the e-turbocharger to speed up or slow down based on the operation of the engine and the level of boost required by the engine. In another implementation, the controller may also monitor a state-of-charge of the energy storage device to selectively provide recharging thereto via operation of the electrified air system. That is, the controller monitors a state-of-charge of the energy storage device and, when the state-of-charge of the energy storage device is below a pre-determined state-of-charge threshold, the controller operates the electrical machine of the e-turbocharger in the generating mode to provide electrical power that may be used to recharge the energy storage device.

Example embodiments of an engine system having an electrified air system including an EGR cooler and an e-turbocharger will now be described in conjunction with FIGS. 1-6 according to this disclosure. By way of non-limiting example, the following describes the engine system as including a turbocharger configured as an e-turbocharger. The following examples notwithstanding, engine systems having internal combustion engines and turbocharger assemblies of other constructions would also benefit from an electrified air system as described being incorporated therein according to aspects of the embodiment. It is therefore recognized that aspects of the embodiment are not meant to be limited only to the specific embodiments described hereafter.

According to embodiments, an engine system is disclosed having an electrified air system including an EGR cooler and an e-turbocharger. As will become apparent to those skilled in the art from the following description, the electrified air system finds particular applicability in Mixed-Pressure-electric engine systems used in a work vehicle, and therefore the illustrative examples discussed herein utilize such an environment to aid in the understanding of the embodiments. The methods and systems disclosed herein, for example, relating to one or more electrified air systems for engines may be suitable for use in different applications, such as for engines in different applications, such as agricultural applications, highway applications, off-highway applications, power generation applications, pumping applications, etc. For instance, the disclosed engine systems could be used with generators, pumps, and boats in addition to highway and off-road vehicles. That is, the examples disclosed herein can be implemented arrangements and configurations depending on the application of the engine.

Referring initially to FIG. 1, a work vehicle 20 is shown that can implement embodiments of the electrified air system. In the illustrated example, the work vehicle 20 is depicted as an agricultural tractor. It will be understood, however, that other configurations may be possible, including configurations with the work vehicle 20 as a different kind of tractor, a harvester, a log skidder, a grader, or one of various other work vehicle types. The work vehicle 20 includes a chassis or frame 22 carried on front and rear wheels 24. Positioned on a forward end region of the chassis 22 is a casing 26 within which is located an engine system 30. The engine system 30 provides power via an associated powertrain 28 to an output member (e.g., an output shaft, not shown) that, in turn, transmits power to axle(s) of the work vehicle 20 to provide propulsion thereto and/or to a power take-off shaft for powering an implement on or associated with the work vehicle 20, for example.

Referring now to FIGS. 2-6, various components of an example engine system 30 that may be included on the work vehicle 20 are depicted. The engine system 30 includes an internal combustion engine 32 (hereafter, "engine") in the form of a spark-ignited engine, although it is recognized that the engine 32 could also be a compression-ignited engine. The engine 32 of the engine system 30 includes an engine block 34 having a piston-cylinder arrangement 36 therein operable to cause combustion events. In the illustrated implementations, the engine 32 is an inline-6 (I-6) engine; however, in alternative implementations various engine styles and layouts may be used. It will be appreciated that the components and subsystems described below can be included with the engine system 30 in various configurations described in further detail below.

The engine system 30 also includes an intake manifold 38 fluidly connected to the engine 32, an exhaust manifold 40 fluidly connected to the engine 32, and a turbocharger 42. In the illustrated embodiment, the turbocharger assembly 42 may be fluidly connected to and in operable communication with the intake manifold 38 and the exhaust manifold 40, although it is recognized that in other embodiments the engine system 30 could instead include multiple turbochargers. The turbocharger assembly 42 includes a turbine 44 and a compressor 46 mechanically connected via a rotatable shaft 48. In operation of the turbocharger 42, exhaust gas flowing through the turbine 44 causes the turbine to rotate, thereby causing the shaft 48 to rotate. Rotation of the shaft 48 in turn, causes the compressor 46, to also rotate, which draws additional air into the compressor 46 to thereby increase or boost the flow rate of air to the intake manifold 38 above what it would otherwise be without the turbocharger 42, and in this manner the turbocharger 42 supply so-called "charge" air to the engine 32.

The intake manifold 38 is in fluid communication with the piston-cylinder arrangement 36 to direct a supply of air thereto. Fresh air is provided to the intake manifold 38 from the ambient environment via a fresh air intake passageway 50. Fresh air is drawn into the fresh air intake passageway 50 and provided to the compressor 46. The fresh air may pass through an air filter disposed in-line with the fresh air intake passageway 50. The compressor 46 performs a compression to the fresh air and provides it to a charge air passageway 52. The charge air passageway 52 then runs to the intake manifold 38 to provide compressed charge air from the compressor 46 to increase the unit mass per unit volume (i.e., density) of the charge air for higher power output. A charge air cooler 54 (i.e., CAC or intercooler) maybe positioned in-line with the charge air passageway 52 that reduces the temperature of the charge air prior to it being provided to the engine 32. In one embodiment, an air throttle 56 is also positioned in the charge air passageway 52 to regulate the amount of compressed charge air provided to the intake manifold 38. As previously mentioned, the use of an e-turbocharger may allow for the removal of the air throttle.

The exhaust manifold 40 of the engine system 30 is fluidly coupled to inlets of the turbine 44 of the turbocharger 42 via an exhaust gas passageway 58, with fluid outlets of the turbine 44 then fluidly coupled to the ambient environment via a vent passageway 60. Exhaust gas produced by the engine 32 is directed out from the exhaust manifold 40 and passes through the exhaust gas passageway 58 to the turbine 44, with the exhaust gas then exiting the turbine 44 to the ambient environment via the vent passageway 60 in a conventional manner.

An exhaust gas recirculation (EGR) system 70 is further provided in the engine system 30 that functions to recirculate a portion of the exhaust gas generated by the engine 32 and thereby reduce the formation of NOx during combustion, prevent combustion events like knock, and regulate exhaust temperatures. Exhaust gas is drawn from the exhaust manifold 40 and recirculated into the intake manifold 38 via the EGR system 70. The EGR system 70 includes an EGR passageway 72, an EGR cooler 74, an EGR pump 76, and an EGR mixer 78. The EGR passageway 72 draws in a portion of the exhaust gas flowing within the exhaust gas passageway 58 for circulation through the EGR system 70. The EGR passageway 72 may draw a portion of the exhaust gas that is flowing within the exhaust gas passageway 58 from a location upstream from the turbocharger 42, but it is recognized that the EGR passageway 72 could instead draw exhaust gas from the vent passageway 60 from a location downstream from the turbocharger 42. The EGR cooler 74 is disposed in-line with the EGR passageway 72 for the purpose of cooling the exhaust gas flowing through the EGR passageway 72. Exhaust gas flows to the EGR pump 76, with the EGR pump 76 having an inlet side in fluid communication with the exhaust manifold 40 and an outlet side in fluid communication with the intake manifold 38. The EGR pump 76 may be a positive-displacement type compressor capable of delivering physically metered air flow rates, such as a roots, screw, scroll, or vane compressor, or alternatively may be a radial-type compressor similar to a turbocharger compressor. The EGR pump 76 may selectively control the flow of exhaust gas recirculated from the exhaust gas passageway 58 to the engine 32 via the EGR passageway 72, including cutting off the flow of exhaust gas therethrough and selectively restricting or controlling the flow of exhaust gas therethrough by a desired amount.

Exhaust gas that is pumped by the EGR pump 76 is provided to the EGR mixer 78, which intermixes the exhaust gas with the charge air provided from the charge air passageway 52 for introduction to the intake manifold 38, by which the mixed exhaust gas and charge air is then fed to the engine 32. For SI engines, the EGR system 70 provides a precise mixture of EGR and air to the intake manifold 38. Further, it is beneficial for the EGR system 70 to provide this precise mixture of EGR and air identically to each cylinder of the engine 32. It may be difficult for the EGR mixer 78 to provide this precise mixture to the intake manifold 38 reliably. Specifically, the EGR mixer 78 may not achieve identical mixtures to all cylinders, may increase pressure losses (efficiency), and can be expensive. Alternatively, if EGR is introduced upstream of the compressor 46, the compressor 46 can act as a very good mixer for precise and identical distribution among cylinders. Likewise, introducing EGR further ahead of the intake manifold is beneficial to provide more opportunity and time to mix with the fresh air. Therefore, in other implementations, a dedicated EGR mixer 78 may not be included in the engine system 18, with exhaust gas instead being introduced to the inlet of the compressor 46, the charge air passageway 52 upstream of the charge air cooler 54, induction piping of the engine 32, and/or the intake manifold 38 for mixing with the charge air.

According to embodiments, the turbocharger 42 and EGR system 70 are provided as part of an overall electrified air system 80 that controls the flow of intake air and exhaust gas within the engine system 30. The turbocharger assembly 42 includes an electrical machine that operates on electrical power provided in the engine system 30 (as will be explained below) to boost the flow of intake air or exhaust gas within the system. Thus, according to an embodiment, an electrical machine 82 is provided in the turbocharger 42, such that the turbocharger 42 is configured as an e-turbocharger. The EGR pump 76 may also include an electrical machine that may drive mechanical components of the EGR pump.

Regarding the turbocharger 42 in the illustrated examples, the turbocharger 42 is configured as the e-turbocharger. The electrical machine 82 is mechanically coupled to the shaft 48 to selectively provide rotational power thereto and receive rotational power therefrom. As will be explained in further detail below, the electrical machine 82 is operable in different modes during operation of the engine system 30, including in a motoring mode and a generating mode. In the motoring mode, the electrical machine 82 provides rotational power to the shaft 48 to either increase or decrease the speed of the compressor 46 to meet the airflow requirements of the engine. In the generating mode, the electrical machine 82 receives rotational power from the shaft 48, which can be used to generate energy or charge an energy storage device on the vehicle.

For providing electrical power to the electrical machine 82 of the e-turbocharger 42, an electrical system 90 is provided in the engine system 30 that may include one or more energy storage devices, inverters, converters, wiring, and other electric components. In one example, the electrical system 90 includes an energy storage device 92 in the form of a lithium-ion battery, although other high-voltage or high-power energy storage devices may instead be employed, such as other battery types, an ultracapacitor, or a combination of ultracapacitors and/or batteries, as examples. The energy storage device 92 provides a DC power to a power converter (not shown), such as a DC-to- DC converter that outputs power to a DC bus 94, with the DC bus 94 providing power to multiple devices, outlets, etc. in the engine system 30, including the electrical machine 82 and components such as a cooling pump (not shown) or an electrical motor of a fan used for cooling (not shown), for example.

The engine system 30 includes a control system 100, which includes a controller 102 or electronic control unit (ECU). The controller 102 includes a processor 104 and memory 106. The processor 104 performs the computation and control functions of the controller 102 and may comprise any type of processor or multiple processors, single integrated circuits such as a microprocessor, or any suitable number of integrated circuit devices and/or circuit boards working in cooperation to accomplish the functions of a processing unit. During operation, the processor 104 executes one or more programs which may be contained within the memory 106 and, as such, controls the general operation of the controller 102 and the computer system of the controller 102 in executing the functions described herein. In the depicted embodiment, the memory 106 stores the above-referenced program(s).

Generally, the controller 102 is used to provide at least some of the engine system operations and functions described herein and, in particular, controls operation of the electrified air system 80. In general, the controller 102 may be electrically coupled with: the engine 32; the c-turbocharger 42; the EGR system 70, for instance, the EGR pump 76; an engine speed sensor 108; and sensor(s) 110 that may include any or all of mass airflow, temperature, and pressure sensors in the intake manifold 38, exhaust manifold 40, or charge air passageway 52, and/or fuel sensors. Sensors 108, 110 may be separate, dedicated sensors. Alternatively, it is recognized that sensing capabilities for measuring some parameters may be built-in to components of the engine system 30. The controller 102 may also be coupled with other devices to provide the desired system control functions. The controller 102 receives inputs from the various sensors that generate signals in proportion to various physical parameters associated with various components in the engine system 30 and any other sources. In some embodiments, the controller 102 may be configured to provide other functionality of the work vehicle 20 in addition to the control functions disclosed herein.

In one implementation, the controller 102 receives inputs on the engine speed and engine load (as determined by air flow and fuel requested/required, for example) to control operation of the e-turbocharger 42 and of the EGR system 70. That is, the controller is able to independently control operation of the e-turbocharger 42 and EGR system 70, including a mode of operation electrical machine and the operating speed of the electrical machine. Regarding the operating mode of the electrical machine, such modes can include a motoring mode and a generating mode. Additionally, the electrical machine 82 may be non-operative (i.e., idle or non-spinning). By such control of the e-turbocharger 42 and EGR system 70, the controller 102 is therefore able to control various operational aspects of the engine system 30 that affect the overall operating efficiency thereof, including a boost provided to the engine 32 via increased flows of intake air and/or exhaust gas, and the amount of electrical power provided back to the electrical system 90 (to recharge the energy storage device 92, for example) during operation of the electrical machine 82 in generating mode.

In general, the controller 102 may control operation of the e-turbocharger 42 and EGR system 70 as part of an engine system optimization that achieves performance targets with an optimized fuel efficiency versus emissions trade-off. In doing so, the controller 102 may access an engine map stored in the memory 106 that includes data on a plurality of operating conditions of the engine system 30, including operation of the engine 32 at a plurality of speeds and a plurality of loads. The controller 102 may then selectively operate the e-turbocharger 42 and/or EGR system 70 based on a current operating condition, as referenced against the plurality of operating conditions in the engine map, including operation of the electrical machine 82 in the motoring mode and the generating mode. That is, the controller 102 may selectively operate the e-turbocharger 42 and/or EGR system 70 during different combinations of low/high speed engine operation and low/high torque engine operation to boost intake air and EGR flow to the engine and/or generate electrical power that may be put back into the electrical system 90. Still further, the controller 102 may also monitor engine system operation to identify highly transient periods of operation during the e-turbocharger 42 may be operated to boost the engine 32.

As one example, during a low speed-high torque operation of the engine 32, the controller 102 may cause the electrical machine 82 of the e-turbocharger 42 to operate in motoring mode. Operation of the electrical machine 82 in motoring mode provides additional rotational power to the shaft 48 and enables the compressor 46 to provide an increased flow of intake air to the engine 32 for low-speed torque. The controller 102 may be programmed to temporarily operate the electrical machine 82 in motoring mode, so as to improve transient response in the engine system 30 and provide the desired engine boost. As previously described, to prevent turbocharger surge, the controller 102 may be programmed to decrease the speed of the turbocharger 42 by controlling the speed of the electrical machine. In doing so, the engine system 30 may not need a relief valve to bleed off high pressure in the system that may occur in traditional engine systems.

As another example, during a high exhaust flow condition of the engine 32, the controller may cause the electrical machine 82 of the e-turbocharger 42 to operate in generating mode. Operation of the electrical machine 82 in generating mode allows for the rotating shaft 48 in the e-turbocharger 42 to drive rotation of the electrical machine 82 to generate electrical power via the electrical machine 82 (which is provided back into the electrical system 90), as there may be a large amount of exhaust gas driving the e-turbocharger 42 during a high engine load condition.

As another example, during a low speed-high torque operation of the engine 32, the controller 102 may cause the electrical machine 82 of the e-turbocharger 42 to operate in combination with a second electrical machine coupled to the fly wheel or gear train to meet the power requirements of the vehicle. Operation of the electrical machine 82 in this mode provides additional rotational power to the shaft 48 and enables the compressor 46 to provide an increased flow of intake air to the engine 32 that is sufficient to avoid engine knock, but insufficient to meet the power requirements of the vehicle. To meet the power requirements of the vehicle, the controller 102 may cause the second electrical machine to provide additional rotational power to the flywheel or gear train. The second electrical machine may obtain power from the electrical system 90, for instance from the energy storage device 92. Therefore, in this operation mode, the total power requirement of the vehicle or application is met by engine 32 using the e-turbocharger 42 that is supplemented by the second electrical machine coupled to the flywheel or gear train.

In controlling operation of the e-turbocharger 42, the controller 102 may also further selectively cause the electrical machine 82 therein to operate in generating mode based (in part) on the state-of-charge of the energy storage device 92. The controller 102 may monitor the state-of-charge of the energy storage device 92 and compare the state-of-charge to a state-of-charge threshold. When the state-of-charge of the energy storage device 92 is below that state-of-charge threshold, the controller 102 may allow/cause operation of the electrical machine 82 in generating mode (based as well on the engine speed/load and transient state). Conversely, when the state-of-charge of the energy storage device 92 is above state-of-charge threshold, the controller 102 may prevent operation of the electrical machine 82 in generating mode and instead cause the electrical machine 82 to be idle. In the generating mode, as much as 10% of the power generated by the engine can be recaptured as electrical energy or stored.

Generally, controlling the engine system including the e-turbocharger includes multiple considerations. Accordingly, the controller 102 may include programs that include the following parameters. The speed of the e-turbocharger is actively controlled to target a specific A/F. If the system still includes an air throttle, the air throttle is used to precisely regulate A/F. The programs may ensure that maximal energy is extracted from the turbine and that necessary EGR flow is also maintained. When EGR is necessary to control combustion knock or preignition, priority is placed on maintaining EGR flow over air delivery. The controller may include other programs to avoid engine knock, including later spark timing or engine derates. Sensors of the control system 100 may conduct EGR condensation checks to avoid corrosion to compressor wheels, housings, air ducting, the charge air cooler, and intake manifolds. The control system will optimally determine overall flywheel efficiency by balancing reductions of pumping losses (air throttling and exhaust restriction) with extracting maximum exhaust energy while maintaining air to fuel ratio and EGR targets. The engine map may further include a compressor and turbine map are used in the control scheme such that undesirable operation can be avoided. For instance, the engine map can prevent the turbocharger from exceeding maximum turbocharger speeds and avoiding compressor surge.

As previously discussed, the components and subsystems described above can be included with the engine system 30 in various configurations described in further detail below.

High Pressure EGR Loop Configuration 1

Figure 2:
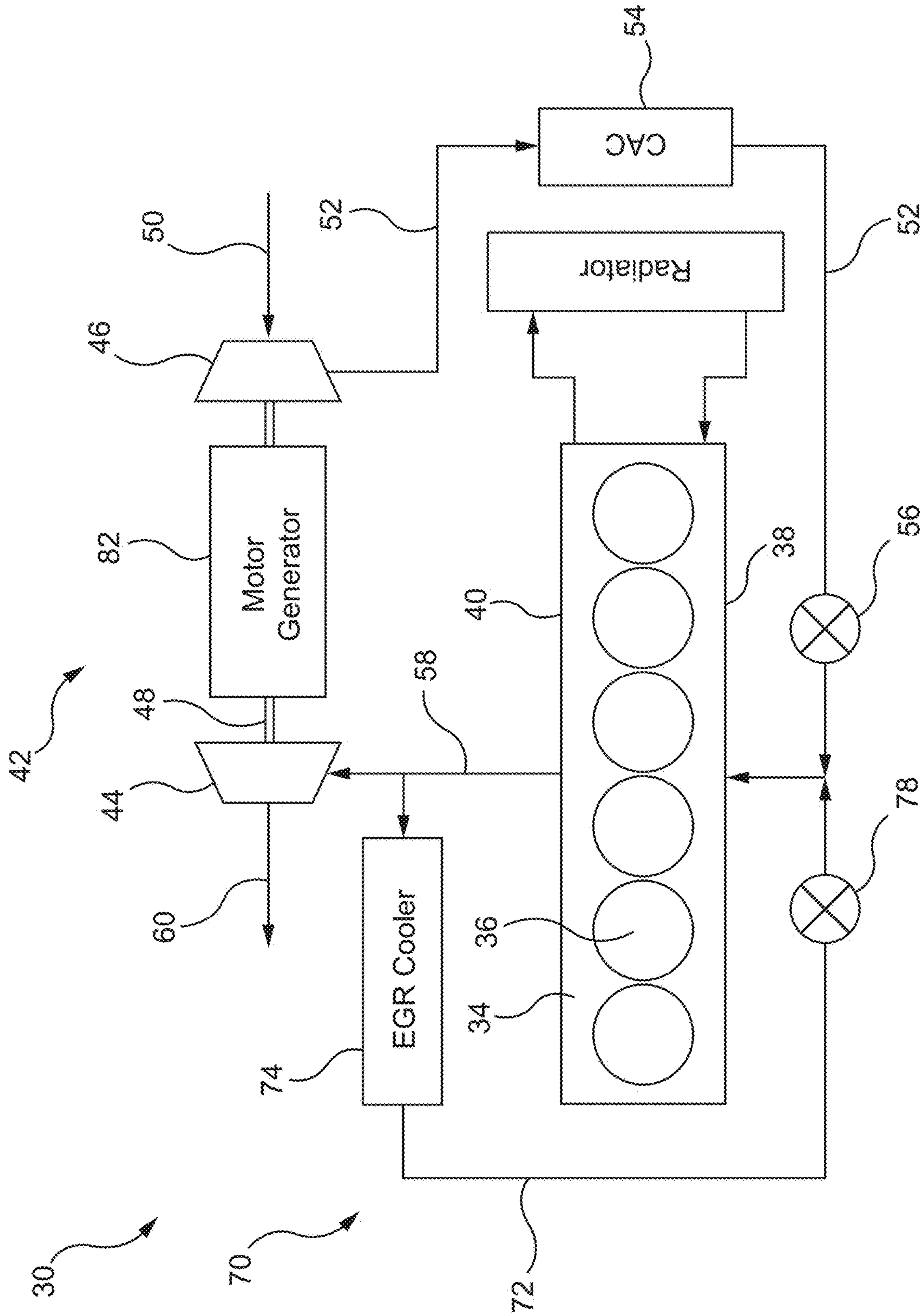
FIG. 2 illustrates an example of an electrified air system for a spark ignition engine with high pressure cooled exhaust gas recirculation.

Turning to FIG. 2, the engine system is shown with an electrified air system having a high pressure EGR system. In this configuration, the EGR system 70 has an EGR passageway 72 that pulls the exhaust gases upstream of the turbocharger 42. The EGR passageway 72 provides the exhaust gases to the EGR cooler 74, which cools the exhaust gases and provides them to the intake manifold 38 of the engine 32. In this configuration, the exhaust gases are removed from a high pressure side of the engine and introduced into the high pressure side of the charge air passageway 52 or the intake manifold 38. This requires that the engine system 30 has a higher exhaust pressure at the exhaust manifold than at the intake manifold. This can lead to pumping loss as the engine may be required to move air plus exhaust gas from a lower pressure state to a higher pressure state which consumes power and decreases the efficiency of the engine system 30. In this configuration, the exhaust gases not used by the EGR system 70 move through the exhaust gas passageway 58 to the inlet of the turbine 44 of the turbocharger 42. After the exhaust gas spins the turbine 44, it moves through a muffler or aftertreatment and is exhausted to the ambient air. The electrical machine 82 of the turbocharger 42 can drive the rotation of the shaft 48 to provide more or less to boost the engine 32 as described above.

In this high-pressure exhaust EGR configuration, the EGR cooler 74 may be exposed to exhaust gas temperatures as high as 750 °C EGR coolers are generally cooled with radiator coolant that is shared with the engine 32. This coolant is run through the EGR cooler 74 to cool the gas to approximately 100-200 °C The coolant is subsequently run back through the engine to the radiator. Therefore, in high pressure EGR configurations, a heat load is added to the radiator, which decreases the efficiency of the engine system.

High Pressure EGR Loop Configuration 2

Figure 3:
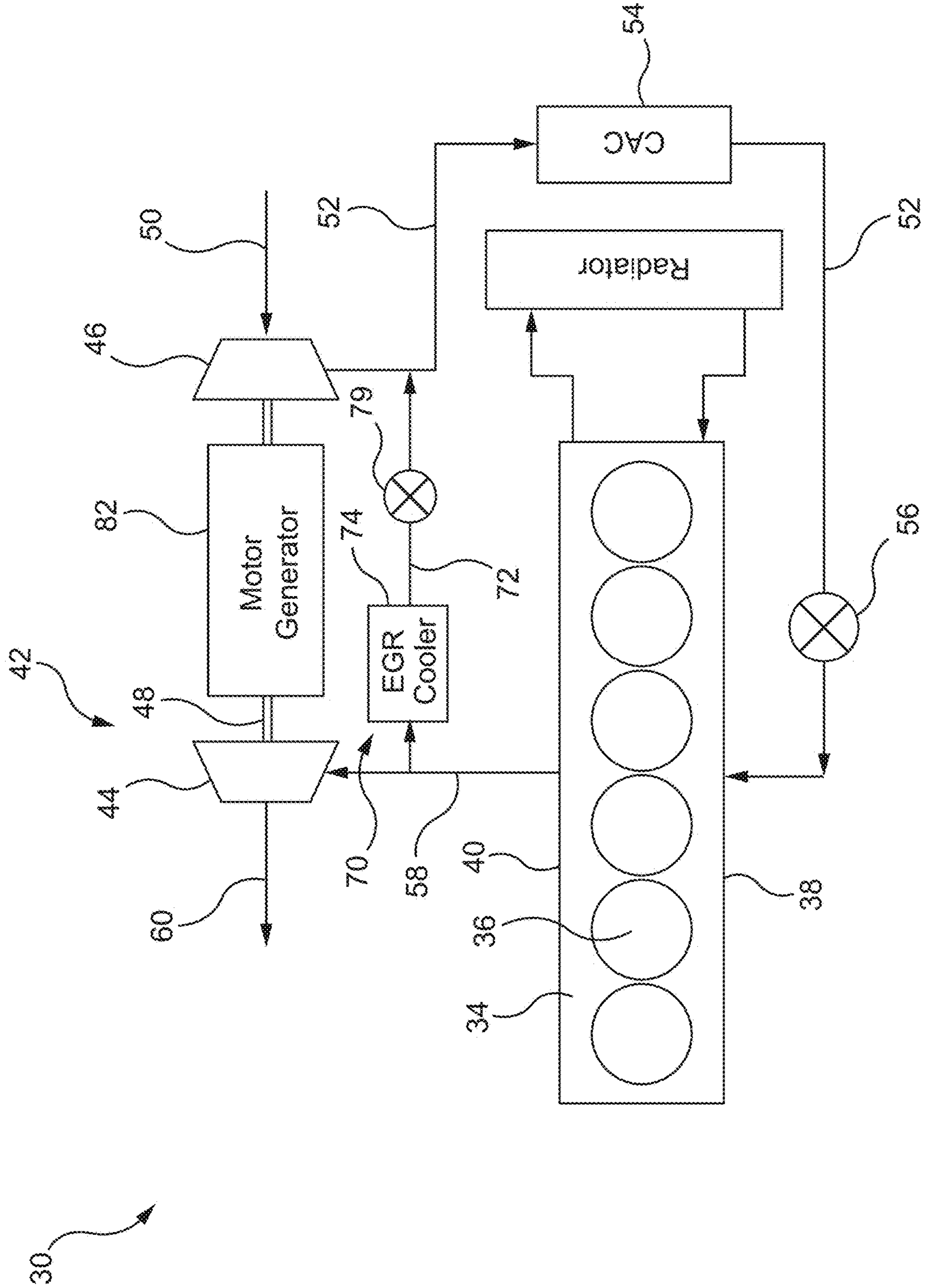
FIG. 3 illustrates an alternative example of an electrified air system for a spark ignition engine with alternative high pressure cooled exhaust gas recirculation.

Turning to FIG. 3, the engine system 30 is shown with an electrified air system 80 having an alternative high pressure EGR system 70. In this configuration, the EGR system 70 has an EGR passageway 72 that pulls the exhaust gases upstream of the turbocharger 42 from the exhaust gas passageway 58. The EGR passageway 72 provides the exhaust gases to the EGR cooler 74, which cools the exhaust gases and provides them to the charge air passageway 52 upstream of the charge air cooler 54. In this configuration, the EGR cooler 74 does not need to cool the exhaust gas as much because the mixed exhaust gas and charged air will move to the charge air cooler 54. In SI engines, airflow demand is lower than a CI engine which leads to the charge air cooler 54 (or intercooler) heat loads being comparatively lower than they are for CI engines. As described further below, the charge air cooler 54 is more efficient at cooling the gases. The burden of partially cooling the exhaust gases is shifted to the charge air cooler 54. In this configuration, the exhaust gases are removed from a high pressure side of the engine 32, partially cooled with the EGR cooler 74, introduced to the high pressure side of the intake in the charge air passageway 52, further and more efficiently cooled by the charge air cooler 54, and finally introduced to the intake manifold 38 by the charge air passageway 52. Accordingly, the heat load of the engine system 30 is balanced more toward the more efficient charge air cooler 54. The mixed exhaust gas and charged air can be properly pressurized by the e-turbocharger to provide the proper boost to the engine 32.

Low Pressure EGR Loop Configuration 1

Figure 4:
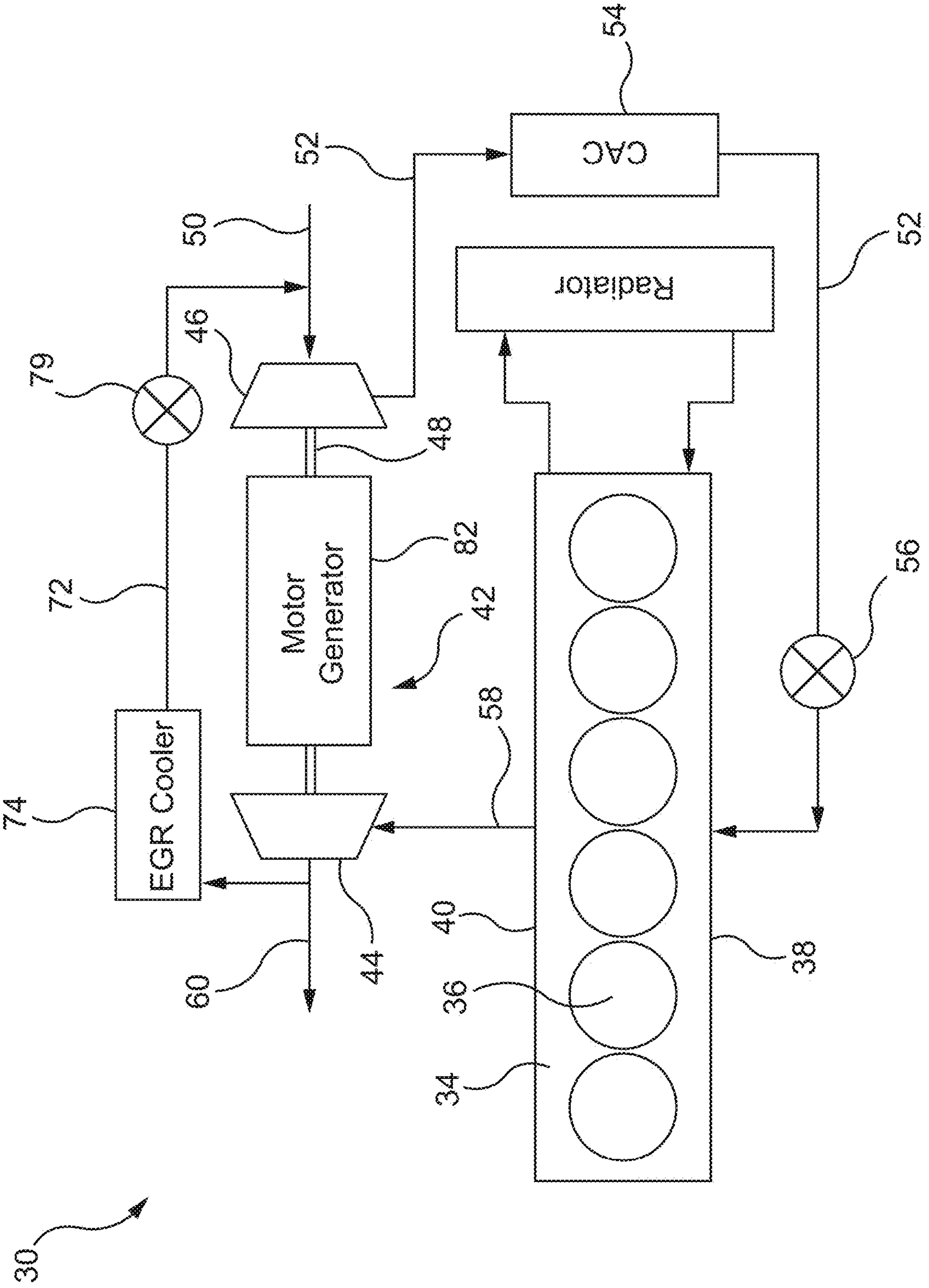
FIG. 4 illustrates an example of an electrified air system for a spark ignition engine with low pressure cooled exhaust gas recirculation.

Turning to FIG. 4, the engine system 30 is shown with an electrified air system 80 having a low pressure cooled EGR system 70. In this configuration, the EGR system 70 has an EGR passageway 72 that moves exhaust gases from the vent passageway 60 downstream from the turbine 44 to the fresh air intake passageway 50 upstream of the compressor 46. An EGR cooler 74 may be included with the EGR passageway 72 to cool the exhaust gases before they enter the fresh air intake passageway 50. An EGR valve 79 may be included in the EGR passageway 72 to allow the controller 102 to selectively introduce the exhaust gases into the fresh air intake passageway 50. In this configuration, pumping losses are reduced because the EGR system 70 no longer requires high pressure from the exhaust manifold 40. As such, the engine system can have high pressure on the intake side at the intake manifold 38 and comparatively lower pressure on the exhaust side at the exhaust manifold 40. In this configuration, the engine system 30 can extract the maximum amount of energy from the exhaust gases. The exhaust gases can move through the exhaust gas passageway 58 to the spin the turbine 44 of the turbocharger. This temperature and kinetic energy can be captured either by rotating the shaft 48 to spin the compressor 46 to produce boost for the engine 32 or the electrical machine 82 receiving the rotational power from the shaft 48, which can be used to generate energy or charge an energy storage device on the vehicle. In the High Pressure EGR configurations, some of the high temperature and high pressure energy is bled off through the EGR system prior to the turbocharger 42. Therefore, this configuration allows more exhaust energy to be recaptured and provides the benefits of the electrical machine 82 being able to precisely and rapidly control the air on the intake side of the engine 32.

This configuration is further beneficial because the thermal burden of cooling the exhaust gas is minimized. Generally, the exhaust gases are cooler after exiting the turbocharger 42. As previously described, in the high pressure exhaust EGR configurations, a heat load is added to the radiator and decreases the efficiency of the engine system 30. In this low pressure EGR configuration, the exhaust gas temperatures exiting the turbine 44 can be approximately 500 °C at full load. Accordingly, in the low pressure configuration, the EGR cooler 74 has to cool the exhaust gases less which leads to a lower heat load on the radiator. When the EGR passageway 72 moves the exhaust gases to the fresh air intake passageway 50, there could be some compressor efficiency loss as there may be hotter temperature gases being introduced into the compressor 46. This may be offset through easier heat transfer to ambient air with the charge air cooler 54 when there is a greater temperature difference, dT, between the ambient air and the gases in the charge air cooler 54. Therefore, compared to a high pressure EGR system, this configuration may be more thermodynamically efficient because the exhaust gases do not need to be cooled as much. Further, the gases that need to be cooled are cooled in the charge air cooler 54, which is a more efficient heat exchanger.

Low Pressure EGR Loop Configuration 2

Figure 5:
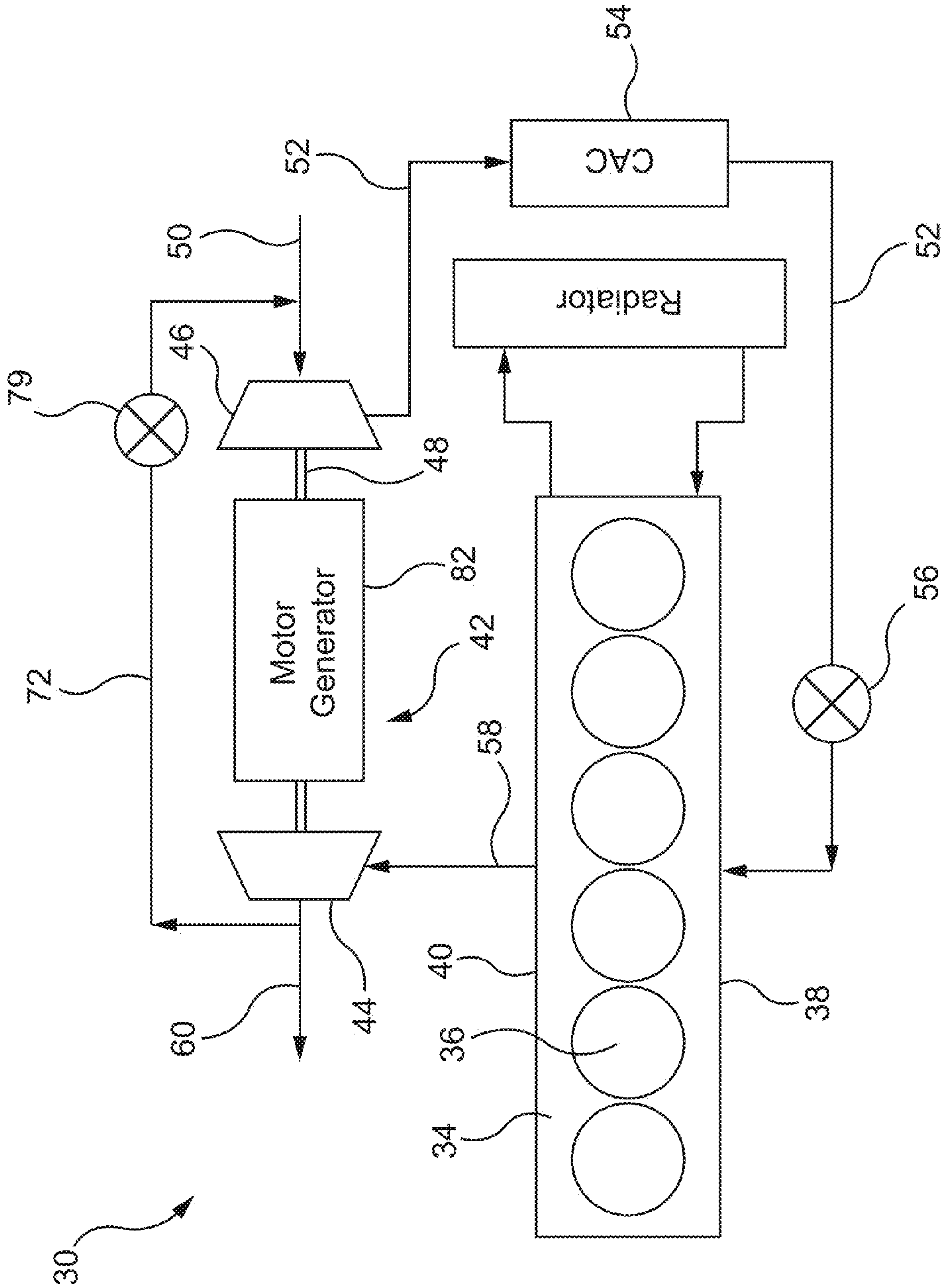
FIG. 5 illustrates an alternative example of an electrified air system for a spark ignition engine with alternative low pressure exhaust gas recirculation.

Turning to FIG. 5, the engine system 30 is shown with an electrified air system 80 having a low pressure EGR system 70. This alternative implementation has the same configuration as the first low pressure EGR loop with the exception that it does not include an EGR cooler 74. As such, the EGR system 70 has an EGR passageway 72 that moves exhaust gases from the vent passageway 60 downstream from the turbine 44 to the fresh air intake passageway 50 upstream of the compressor 46. An EGR valve 79 may be included in the EGR passageway 72 to allow the controller 102 to selectively introduce the exhaust gases into the fresh air intake passageway 50. This configuration has many of the same benefits as the first Low Pressure EGR loop configuration. The primary difference is the gas temperatures entering the compressor 46 may be higher because they are not cooled by an EGR cooler 74. Therefore, the dT of the gases in the charge air cooler 54 are greater. Because the charge air cooler 54 is designed for efficient heat transfer to the ambient air, this configuration may be more efficient than a system including an EGR cooler. This configuration may allow the SI engine to thermodynamically operate with a cooling system (radiator and CAC) that is more similar to the cooling system of a CI engine, in which approximately 65-80% of the heat load is in the radiator and approximately 20-35% of the heat load is in the charge air cooler 54. In other words, SI engines in this configuration would have a more balanced heat load that is similar to traditional CI engines, which may reduce redesign costs for cooling systems in vehicles using this engine system 30.

Mixed-Pressure Pressure EGR Loop Configuration

Figure 6:
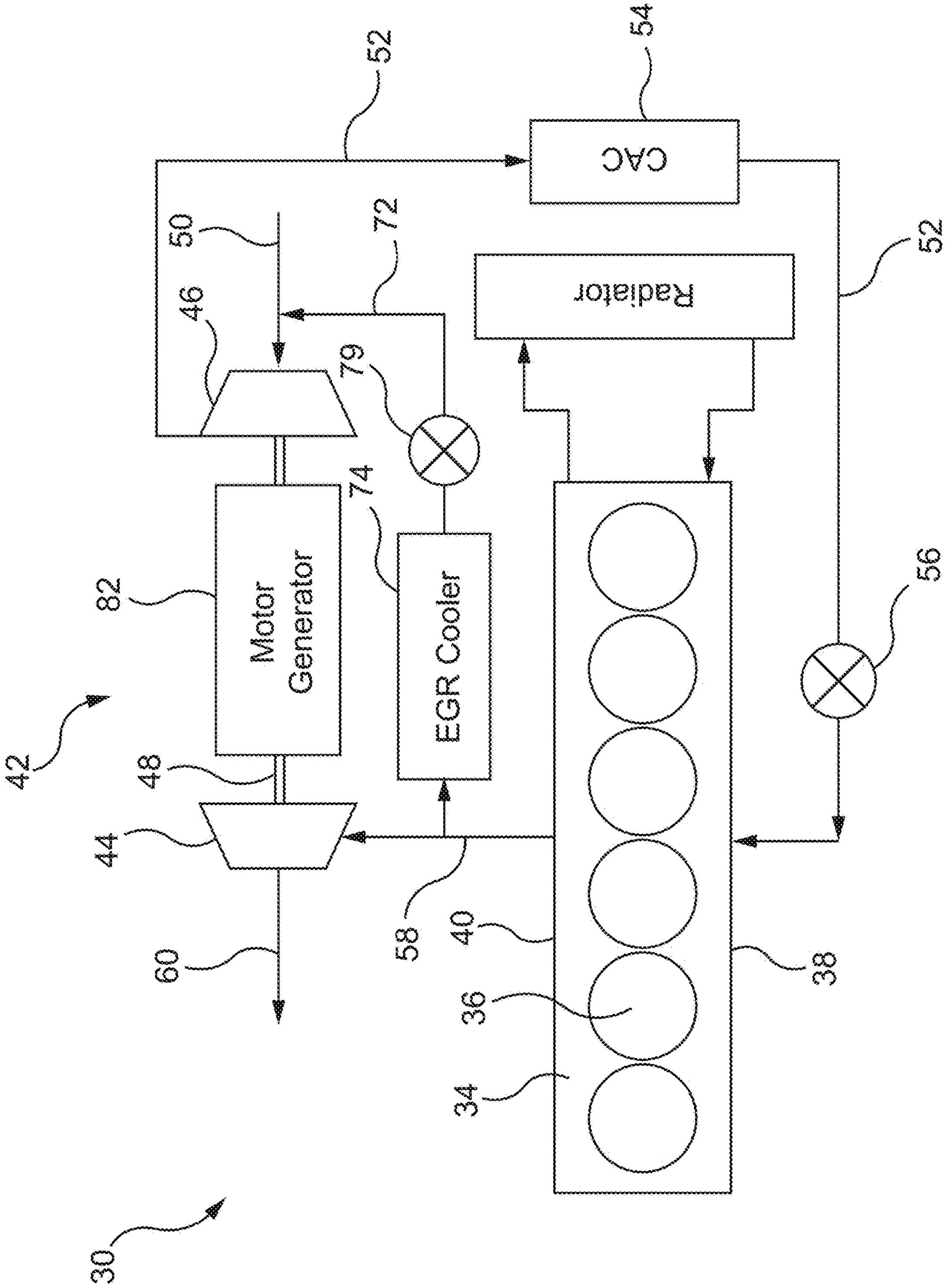
FIG. 6 illustrates an example of an electrified air system for a spark ignition engine with Mixed-Pressure pressure cooled exhaust gas recirculation.
Figure 7:
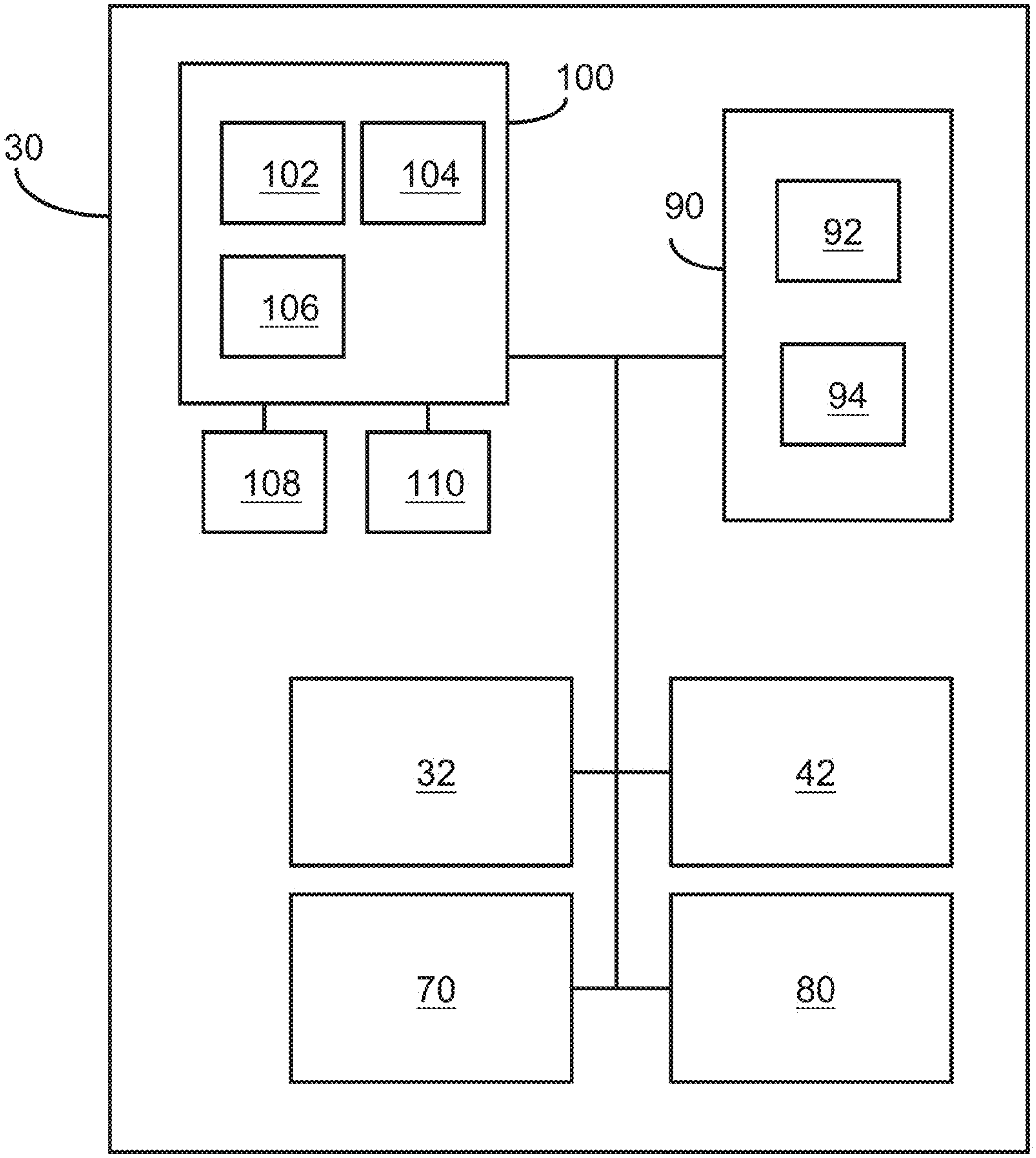
FIG. 7 is a schematic drawing of the engine system and its subsystems.

Turning to FIG. 6, the engine system 30 is shown with an electrified air system 80 having a Mixed-Pressure pressure cooled EGR system 70. This configuration is particularly beneficial if the engine needs a lot of EGR to reduce emissions like NOx emissions. Increasing the EGR can also help mitigate abnormal combustion events like engine knock. In some of the previous configurations, the ability to drive EGR may be diminished because the EGR passageway is downstream from the turbocharger 42 and there is less pressure in the exhaust gas after it exits the turbine 44. For instance, in the low pressure configurations, the pressure difference may be 20 kPa. In this Mixed-Pressure configuration, the EGR system 70 has an EGR passageway 72 that pulls the exhaust gases upstream of the turbocharger 42 from the exhaust gas passageway 58. The EGR passageway 72 provides the exhaust gases to the EGR cooler 74, which cools the exhaust gases and provides them to the fresh air intake passageway 50 upstream of the compressor 46. An EGR valve 79 may be included in the EGR passageway 72 to allow the controller 102 to selectively introduce the exhaust gases into the fresh air intake passageway 50. In this configuration, the pressure difference can be 350 kPa between the exhaust gas passageway 58 and the ambient air. Any amount of that exhaust pressure can be used to drive the flow of EGR, with the remainder of the exhaust gas being moved through the exhaust gas passageway 58 to the turbine 44 of the turbocharger 42. The e-turbocharger 42 is beneficial in this configuration because it quickly handles the higher volume of gas being introduced into the compressor 46 from higher EGR rates. The controller 102 can adjust to the speed of the electrical machine 82 to manage high EGR rates and the increase in air volume present between the compressor 46 and the intake manifold 38.

Beneficially, the engine system 30 as described herein—as well as control/operation of the engine system 30—provides for controlled operation of an electrified air system 80 (including an e-turbocharger 42 its associated electrical machine 82) to control various operational aspects of the engine system 30 that affect the overall operating efficiency thereof. For example, selective operation of the electrical machine 82 of the e-turbocharger 42 may provide a boost to the engine 32 via increased flows of intake air and/or exhaust gas or generate electrical power that is provided back to the electrical system 90 to recharge the energy storage device 92. Controlling the boost provided to the engine 32 with the electrical machine 82 of the e-turbocharger mitigates efficiency issues common to SI engines. As an example, controlling the electrical machine 82 of the e-turbocharger, can remove or reduce the need for air throttling to achieve the perfect air to fuel ratio. As such, the engine can be properly managed at low engine speeds to prevent engine knock. The electrical machine 82 of the e-turbocharger can precisely slow down the turbocharger to prevent turbocharger surge that can damage the engine system. Therefore, the pressure relief valve or blow off valve common to traditional engine systems may be removed from the engine system. Further, use of the e-turbocharger can balance the heat load of SI engines so that they are more similar to traditional CI engines and may allow for reducing the size of the EGR cooler 74 or removing the EGR cooler. In achieving a similar balance to traditional CI engines, the cooling systems of vehicles using these SI engine systems would need extensive redesigns.

According to an aspect, an engine system is provided. The engine system may have an engine having an intake manifold and an exhaust manifold. The engine system may include a charge air cooler in fluid communication with the intake manifold and configured to reduce a temperature of airflow introduced to the intake manifold. The engine system may also include an electrified air system configured to selectively increase a flow of intake air and exhaust gas to the engine. The electrified air system may comprise an exhaust gas recirculation (EGR) system and an electric turbocharger. The electric turbocharger may include a turbine in communication with the exhaust manifold, a compressor in fluid communication with the intake manifold and configured to be driven by the turbine by a shaft coupled therebetween, and an electrical machine coupled to the shaft. The electrified air system may further comprise a controller, including a processor and memory architecture, operably connected with the electrified air system, the controller configured to operate the electrical machine to control a rotational speed of the shaft. The controller can selectively control the electrical machine to increase the rotational speed of the shaft to increase the speed of the compressor or decrease the rotational speed of the shaft to decrease the speed of the compressor to control an air to fuel mixture entering the intake manifold.

In an example, the engine system may further comprise an air throttle in fluid communication with an outlet of the compressor and an inlet of the intake manifold, the air throttle configured to finely adjust the airflow introduced to the intake manifold.

In another example, the engine system may further comprise a pressure relief valve in fluid communication with an outlet of the compressor and an inlet of the intake manifold, the pressure relief valve configured to relieve an increase in pressure resulting from an abrupt change in the engine speed or air flow metered into the intake manifold.

In another example, the EGR system comprises an EGR passageway in fluid communication with an outlet of the turbine and inlet of the compressor.

In another example, the EGR system further comprises an EGR valve, wherein the controller is configured to selectively operate the EGR valve to increase or decrease an amount of exhaust gases being introduced to the inlet of the compressor.

In another example, the EGR system comprises an EGR cooler configured to decrease the temperature of exhaust gases.

In another example, an inlet of the EGR cooler is in fluid communication with an exhaust passage between the exhaust manifold and an inlet of the turbine.

In another example, an outlet of the EGR cooler is in fluid communication with the intake manifold.

In another example, an outlet of the EGR cooler is in fluid communication with an inlet of the compressor.

In another example, an outlet of the EGR cooler is in fluid communication with a passage between the outlet of the compressor and the inlet of a charge air cooler that is in fluid communication with the intake manifold.

In another example, an inlet of the EGR cooler is in fluid communication with an outlet of the turbine and the outlet of the EGR cooler is in fluid communication with an inlet of the compressor.

In another example, the EGR system further comprises an EGR valve, wherein the controller is configured to selectively operate the EGR valve to increase or decrease an amount of exhaust gases being introduced to the intake manifold.

In another example, the electrical machine is configured to receive rotational power from the shaft and generate energy, wherein an electrical system having an electrical bus is configured to control the electrical bus to store the generated energy in an energy storage device, provide power to a flywheel of the engine, or provide power to an electric machine of an EGR pump.

In another example, the engine is a spark-ignited engine.

In another example, the spark-ignited engine uses a low $CO_2$ fuel.

In another example, the low $CO_2$ fuel is one of biogas, renewable methane, hydrogen alcohols, liquid biofuels, ammonia, or synthetic liquid hydrocarbon fuels.

According to another aspect, an engine system is provided. The engine system may include an engine having an intake manifold and an exhaust manifold, a charge air cooler in fluid communication with the intake manifold and configured to reduce a temperature of airflow introduced to the intake manifold, and an electrified air system configured to selectively increase a flow of intake air and exhaust gas to the engine. The electrified air system may comprise an exhaust gas recirculation (EGR) system and an electric turbocharger. The electric turbocharger may include a turbine in communication with the exhaust manifold, a compressor in fluid communication with the intake manifold and configured to be driven by the turbine by a shaft coupled therebetween, and an electrical machine coupled to the shaft. The electrified air system may also include an air throttle in fluid communication with an outlet of the compressor and an inlet of the intake manifold, the air throttle configured to finely adjust the airflow introduced to the intake manifold and a controller, including a processor and memory architecture, operably connected with the electrified air system. The controller may be configured to operate the electrical machine to control a rotational speed of the shaft. The controller may selectively control the electrical machine to increase the rotational speed of the shaft to increase the speed of the compressor or decrease the rotational speed of the shaft to decrease the speed of the compressor to control an air to fuel mixture entering the intake manifold.

In an example, the EGR system comprises an EGR passageway in fluid communication with an outlet of the turbine and inlet of the compressor, the EGR passageway having an EGR valve, wherein the controller is configured to selectively operate the EGR valve to increase or decrease an amount of exhaust gases being introduced to the inlet of the compressor.

In another example, the EGR passageway comprises an EGR cooler between the outlet of the turbine and the EGR valve, the EGR cooler being configured to decrease the temperature of exhaust gases.

According to yet another aspect, an engine system is provided. The engine system may comprise an engine having one or more piston-cylinder arrangements in fluid communication with an intake manifold and an exhaust manifold, a charge air cooler in fluid communication with the intake manifold and configured to reduce a temperature of airflow introduced to the intake manifold, and an electrical power system configured to provide electrical power in the engine system, the electrical power system comprising an electrical bus. The engine system may also comprise an electrified air system powered by the electrical power from the electrical power system to selectively increase a flow of intake air and exhaust gas to the engine. The electrified air system may comprise an exhaust gas recirculation (EGR) system and an electric turbocharger. The electric turbocharger may comprise a turbine in communication with the exhaust manifold, a compressor in fluid communication with the intake manifold and configured to be driven by the turbine by a shaft coupled therebetween, and an electrical machine coupled to the shaft. The electrified air system may also comprise a controller, including a processor and memory architecture, operably connected with the electrified air system, the controller configured to operate the electrical machine to control a rotational speed of the shaft. The controller may selectively control the electrical machine to increase the rotational speed of the shaft to increase the speed of the compressor or decrease the rotational speed of the shaft to decrease the speed of the compressor to control an air to fuel mixture entering the intake manifold.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this implementation. It is intended to include all such modifications and alterations in so far as they come within the scope of the appended claims or the equivalents thereof.

What is claimed is:

1. An engine system comprising:

an engine having an intake manifold and an exhaust manifold;

a charge air cooler in fluid communication with the intake manifold and configured to reduce a temperature of airflow introduced to the intake manifold; and an electrified air system configured to selectively increase a flow of intake air and exhaust gas to the engine, the electrified air system comprising:

an exhaust gas recirculation (EGR) system; and an electric turbocharger having:

a turbine in fluid communication with the exhaust manifold;

a compressor in fluid communication with the intake manifold and configured to be driven by the turbine by a shaft coupled therebetween; and an electrical machine coupled to the shaft; and a controller, including a processor and memory architecture, operably connected with the electrified air system, the controller configured to operate the electrical machine to control a rotational speed of the shaft, wherein the controller selectively controls the electrical machine to increase the rotational speed of the shaft to increase the speed of the compressor or decrease the rotational speed of the shaft to decrease the speed of the compressor to control an air to fuel mixture entering the intake manifold without an air throttle, wherein the controller is configured to increase or decrease the speed of the compressor to prevent engine knock.

2. The engine system of claim 1, further comprising a pressure relief valve in fluid communication with an outlet of the compressor and an inlet of the intake manifold, the pressure relief valve configured to relieve an increase in pressure resulting from an abrupt change in the engine speed or air flow metered into the intake manifold.

3. The engine system of claim 1, wherein the EGR system comprises an EGR passageway in fluid communication with an outlet of the turbine and an inlet of the compressor.

4. The engine system of claim 3, wherein the EGR system further comprises an EGR valve, wherein the controller is configured to selectively operate the EGR valve to increase or decrease an amount of exhaust gases being introduced to the inlet of the compressor.

5. The engine system of claim 1, wherein the EGR system comprises an EGR cooler configured to decrease the temperature of exhaust gases.

6. The engine system of claim 5, wherein an inlet of the EGR cooler is in fluid communication with an exhaust passage between the exhaust manifold and an inlet of the turbine.

7. The engine system of claim 6, wherein an outlet of the EGR cooler is in fluid communication with the intake manifold.

8. The engine system of claim 6, wherein an outlet of the EGR cooler is in fluid communication with an inlet of the compressor.

9. The engine system of claim 6, wherein an outlet of the EGR cooler is in fluid communication with a passage between an outlet of the compressor and an inlet of the charge air cooler that is in fluid communication with the intake manifold.

10. The engine system of claim 5, wherein an inlet of the EGR cooler is in fluid communication with an outlet of the turbine and the outlet of the EGR cooler is in fluid communication with an inlet of the compressor.

11. The engine system of claim 1, wherein the EGR system further comprises an EGR valve, wherein the controller is configured to selectively operate the EGR valve to increase or decrease an amount of exhaust gases being introduced to the intake manifold.

12. The engine system of claim 1, wherein the electrical machine is configured to receive rotational power from the shaft and generate energy, wherein an electrical system having an electrical bus is configured to control the electrical bus to store the generated energy in an energy storage device, provide power to a flywheel of the engine, or provide power to an electric machine of an EGR pump.

13. The engine system of claim 1, wherein the engine is a spark-ignited engine.

14. The engine system of claim 13, wherein the spark-ignited engine uses a low CO2 fuel.

15. The engine system of claim 14, wherein the low CO2 fuel is one of biogas, renewable methane, hydrogen alcohols, liquid biofuels, ammonia, or synthetic liquid hydrocarbon fuels.

16. An engine system comprising:

an engine having an intake manifold and an exhaust manifold;

a charge air cooler in fluid communication with the intake manifold and configured to reduce a temperature of airflow introduced to the intake manifold; and an electrified air system configured to selectively increase a flow of intake air and exhaust gas to the engine, the electrified air system comprising:

an exhaust gas recirculation (EGR) system;

an electric turbocharger having:

a turbine in fluid communication with the exhaust manifold;

a compressor in fluid communication with the intake manifold and configured to be driven by the turbine by a shaft coupled therebetween; and an electrical machine coupled to the shaft, an air throttle in fluid communication with an outlet of the compressor and an inlet of the intake manifold, the air throttle configured to finely adjust the airflow introduced to the intake manifold; and a controller, including a processor and memory architecture, operably connected with the electrified air system, the controller configured to operate the electrical machine to control a rotational speed of the shaft, wherein the controller selectively controls the electrical machine to increase the rotational speed of the shaft to increase the speed of the compressor or decrease the rotational speed of the shaft to decrease the speed of the compressor to control an air to fuel mixture entering the intake manifold and the controller is configured to control the electrical machine to prevent a pressure spike without a pressure relief valve and an air throttle.

17. The engine system of claim 16, wherein the EGR system comprises an EGR passageway in fluid communication with an outlet of the turbine and an inlet of the compressor, the EGR passageway having an EGR valve, wherein the controller is configured to selectively operate the EGR valve to increase or decrease an amount of exhaust gases being introduced to the inlet of the compressor.

18. The engine system of claim 17, wherein the EGR passageway comprises an EGR cooler between the outlet of the turbine and the EGR valve, the EGR cooler being configured to decrease the temperature of exhaust gases.

19. An engine system comprising:

an engine having one or more piston-cylinder arrangements in fluid communication with an intake manifold and an exhaust manifold;

a charge air cooler in fluid communication with the intake manifold and configured to reduce a temperature of airflow introduced to the intake manifold;

an electrical power system configured to provide electrical power in the engine system, the electrical power system comprising an electrical bus; and an electrified air system powered by the electrical power from the electrical power system to selectively increase a flow of intake air and exhaust gas to the engine, the electrified air system comprising:

an exhaust gas recirculation (EGR) system, the EGR system having an EGR cooler configured to decrease the temperature of exhaust gases;

an electric turbocharger having:

a turbine in fluid communication with the exhaust manifold;

a compressor in fluid communication with the intake manifold and configured to be driven by the turbine by a shaft coupled therebetween; and an electrical machine coupled to the shaft; and a controller, including a processor and memory architecture, operably connected with the electrified air system, the controller configured to operate the electrical machine to control a rotational speed of the shaft, wherein the controller selectively controls the electrical machine to increase the rotational speed of the shaft to increase the speed of the compressor or decrease the rotational speed of the shaft to decrease the speed of the compressor to control an air to fuel mixture entering the intake manifold wherein an inlet of the EGR cooler is in fluid communication with an exhaust passage between the exhaust manifold and an inlet of the turbine and an outlet of the EGR cooler is in fluid communication with a passage between an outlet of the compressor and an inlet of the charge air cooler that is in fluid communication with the intake manifold.

* * * * *